United States Patent Office 3,534,923
Patented Oct. 20, 1970

3,534,923

RECORD MEDIUM TRANSPORT APPARATUS

Rinske Wakabayashi, Tokyo, Japan, assignor to Aiwa Co., Ltd., Tokyo, Japan, a corporation of Japan Filed June 5, 1968, Ser. No. 734,847
Claims priority, application Japan, Oct. 7, 1967, 42/64,600
Int. Cl. B11b *15/32;* G03b *1/04*
U.S. Cl. 242—208 3 Claims

ABSTRACT OF THE DISCLOSURE

Means for controlling the drive of a pair of rotating bodies in a magnetic tape recorder, motion picture camera or the like, which includes a mechanism comprising a belt for conveying the driving force to one of the rotating bodies, means for adjusting the tension of the belt and means for pressing a pulley onto the driving shaft to rotate the other rotating body, and which thereby insures a smooth and simultaneous stopping action of the rotating bodies.

BACKGROUND OF THE INVENTION

The present invention relates to a means for controlling the drive of a plurality of rotating bodies, which is adapted to change the rotating speed and rotating direction of a pair of rotating bodies in a machine, such as a magnetic tape recorder, motion-picture camera, motion-picture projector or the like, as desired by a simple operation and stop said rotating bodies exactly without requiring any special braking element.

In the operation of a magnetic tape recorder, motion-picture projector or the like, it is essential that the supply and take-up reels be stopped quickly without producing excessive tension or slackness in a tape or film. For this purpose, a considerably complicated mechanism has been used in conventional machines.

SUMMARY OF THE INVENTION

The object of the present invention is to provide a simple, reliable driving mechanism for a machine of the type using a plurality of rotating bodies, which is simpler than that used in conventional machines and which therefore enables a machine of the type described to be simplified.

According to the present invention, there is provided a simple and compact mechanism which is capable of stopping tape reels or the like quickly without producing excessive tension or slackness in the tape and which includes no brake shoe or slip means half brake effects mechanism as has been required in conventional magnetic tape recorders or similar machines.

More specifically, the present invention provides means for controlling the drive of rotating bodies, which includes a mechanism comprising a base plate having first and second rotary discs and a driving wheel mounted thereon, a belt having small coefficient of extension and contraction for transmitting the drive of said driving wheel to said second rotary disc therethrough to drive the latter, means for adjusting the tension of said belt and means for pressing a pulley against said driving wheel to transmit the drive of said driving wheel to said first rotary disc, said mechanism being operative in such a way that said first and second rotary discs are stopped immediately when said pulley is pressed against said driving wheel in a de-energized state and tension is introduced into said belt, and said first rotary disc is forcibly rotated for the rewind operation when said pulley is pressed against said driving wheel during the rotation of the latter in a predetermined direction and said belt is not taut, and further said second rotary disc is rotated either forcibly or slidably depending upon the degree of tension in said belt for fast forward or normal forward operation when said pulley is not pressed against said driving wheel during the rotation of the latter.

DESCRIPTION OF THE PREFERRED EMBODIMENT

Figure 1:
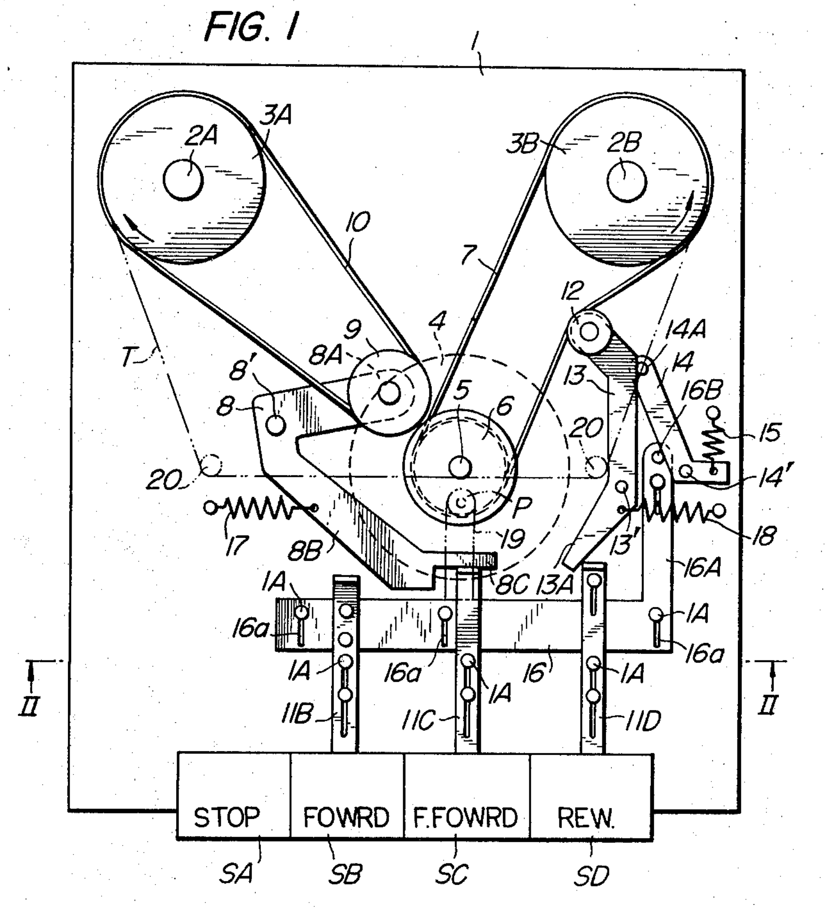
FIG. 1 is a plan view of an embodiment of the present invention.
Figure 2:
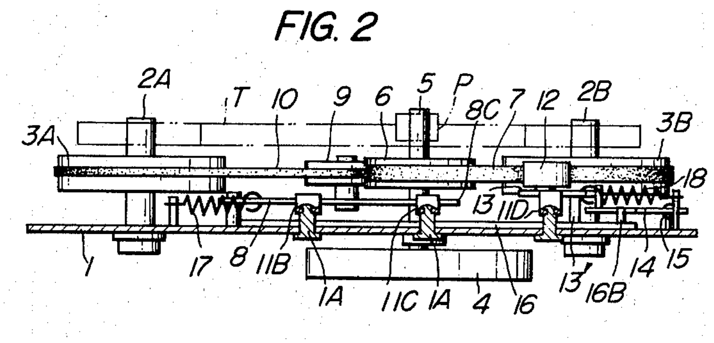
FIG. 2 is a transverse cross-sectional view of the mechanism taken along the sectioning line II—II in FIG. 1.

The present invention will now be described in detail by way of example with reference to the accompanying drawings.

Referring to the drawings, a base plate 1 is made of a metal or a hard synthetic resin. A rotary shaft 2A for a supply and rewind reel and a rotary shaft 2B for a take-up reel are rotatably mounted symmetrically, for instance, on the rear portion of said base plate, and rotary discs 3A and 3B are mounted on said respective rotary shafts. A capstan 5 which is coaxial with a flywheel 4 is rotatably provided at substantially the center of the base plate 1, said flywheel being driven from an electric motor not shown. Mounted on the capstan 5 is a driving wheel 6 which is operatively connected with the winding rotary disc 3B by means of a belt. The belt 7 is made of a material, such as hemp yarn or synthetic fiber, which has low coefficients of extension and contraction and is slippery, and is engaged around the peripheral surface of said rotary disc 3B under a slight tension.

Figures 6, 7, 8:
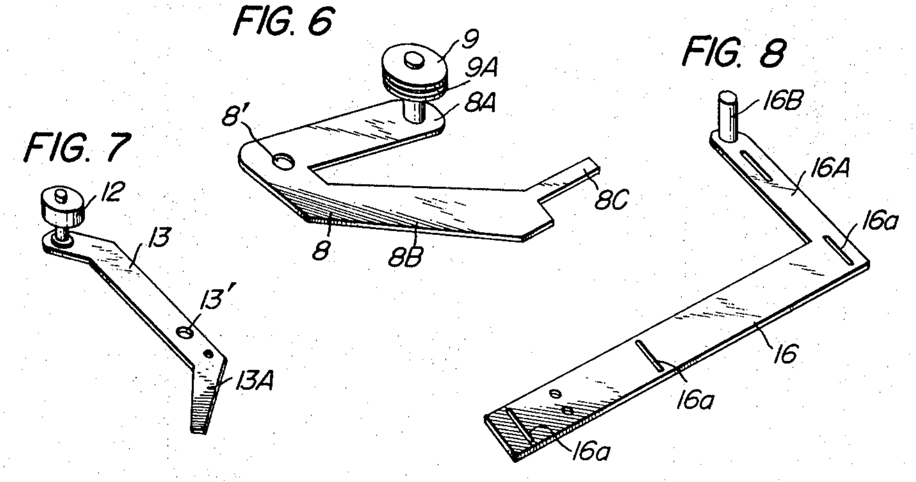
FIG. 6 is a perspective view of a swinging member.
FIG. 7 is a perspective view of another swinging member.
FIG. 8 is a perspective view of a sliding member.

On the left-hand side of the capstan 5 is provided a swinging member 8 which is pivotally mounted on the base plate 1 at a mounting hole 8'. The swinging member 8 carries at the rear end 9 thereof a pulley 9 having an annular groove 9A formed in the peripheral surface thereof, as best shown in FIG. 6, and a belt 10 of flexible material such as rubber, is engaged around said peripheral groove 9A of the pulley 9 and the peripheral surface of the supply and rewinding rotary disc 3A. One of the arms 8B of the swinging member 8 is formed with a projection 8C extending to the right. An operating rod 11C for engagement with the front edge of the projection 8C of the swinging member 8 has its front end connected to a fast forward push button SC of a push button-type switch which is fixedly mounted on the base plate 1 but not shown in the drawings, it may be of any conventional type. Another swinging member 13 is pivotally mounted on the right-hand side of the base plate 1 at a mounting hole 13' formed therein. As best shown in FIG. 7, this swinging member 13 carries a roller 12 at one end which is adapted to press the belt 7 for adjusting the degree of tension in said belt. In order to bias the swinging member 13, a pushing member 14 which is adapted to push the right side edge of the swinging member 13 is pivotally mounted on the base plate 1 at a mounting hole 14' formed therein. The right side end of the pushing member 14 is connected to one end of a tension spring 15 the other end of which is connected to the base plate 1. An operating rod 11D is provided for engagement of the front slanting edge 13A of the swinging member 13, with the front end thereof connected to a rewind push button SD of the aforesaid push button-type switch. Between the operating rods 11C, 11D and the base plate 1 is disposed an L-shaped sliding member 16 as shown in FIG.

8. The L-shaped sliding member is provided with slots 16*a*, 16*a* for engagement with respective pins 1A, 1A extending upwardly from the surface of the base plate 1. After mounting the sliding member 16 with the pins 1A, 1A extending through the respective slots 16*a*, 16*a* washers are fitted on the top end of the respective pins so that said sliding member will not move upwardly but slide in fore-and-aft direction parallel with the surface of the base plate 1 and the operating rods 11C, 11D. The sliding member 16 is provided at the free end of an arm 16A with a boss 16B for abutment against the left side edge of the pushing member 14. The left end portion of the sliding member 16 is connected to a normal advancing push button SB through an operating rod 11B. The swinging member 8 is biased in a clockwise direction by a spring 17 which has one end connected to the front arm of said member at a point to the right of the mounting hole 8', while the swinging member 13 is biased in a counterclockwise direction by a spring 18 which has one end connected to said member at a point forwardly of the mounting hole 13', the other ends of said springs 17 and 18 being connected to the base plate 1 adjacent to the opposite edges thereof.

The electric motor, not shown, is supplied with a current when the operating switch buttons SB, SC and SD, other than a stop button SA, are pressed individually, so as to drive the capstan 5 and the driving wheel 6. A pinch roller P is resiliently connected to the central portion of the sliding member 16 by means of a sliding arm 19 and a spring. The arrangement is such that a magnetic tape T extending from one reel (not shown) mounted on the rotary shaft 2A of the rotary disc 3A to another reel (not shown) mounted on the rotary shaft 2B of the rotary disc 3B, is pinched between the capstan 5 and the pinch roller P only when the sliding member 16 is moved rearward of the machine and travels at a predetermined rate through guide pins 20, 20. The operating rods 11B, 11C and 11D are respectively provided therein with a slot which is in engagement with an upstanding pin 1A on the base plate 1, whereby lateral and swinging movements of said operating rods are prevented.

The mechanism of the present invention constructed as described hereinabove will operate in the following manner. Namely, when the magnetic tape recorder, provided with the inventive mechanism, is in an inoperative position as shown in FIG. 1, no current is supplied to the electric motor as described previously and accordingly the capstan 5, flywheel 4 and driving wheel 6 are held stationary. Therefore, the rotary discs 3A, 3B, operatively connected to the driving wheel 6 by means of the belts 10 and 7 respectively, are not rotating. In the event that either one of the rotary discs 3A or 3B is encouraged even slightly to rotate in the direction of the arrow upon movement of the machine, the other rotary disc 3B or 3A is encouraged to rotate in an opposite direction through the belts 7, 10 and driving wheel 6. Thus, the undesirable rotation of the rotary discs 3A, 3B can be prevented, the magnetic tape T being only tensed slightly, and the magnetic tape recorder can be maintained reliably in the inoperative state.

Figure 3:
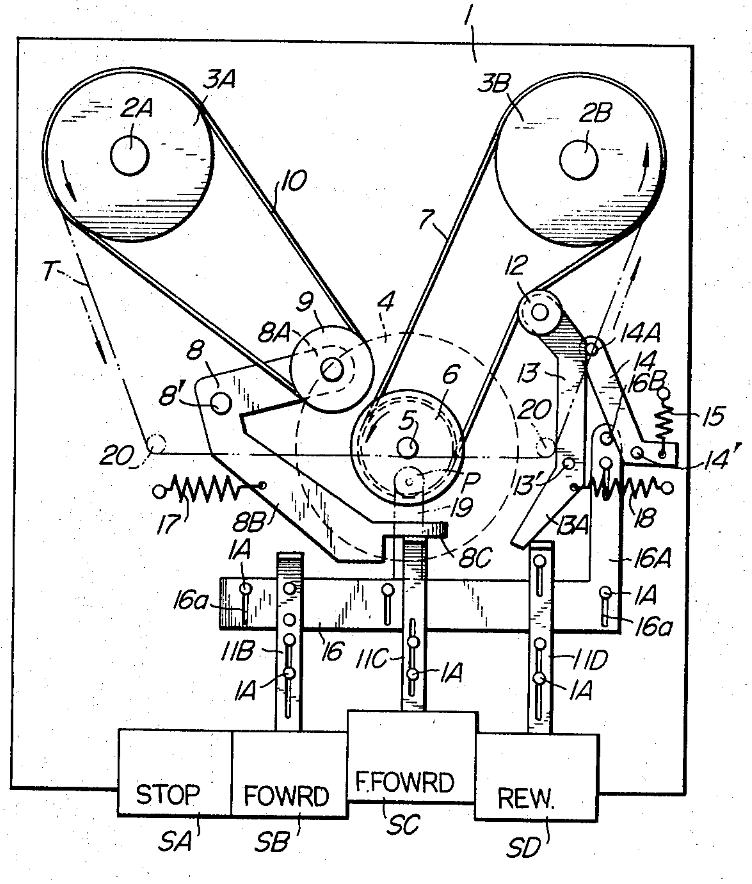
FIGS. 3, 4 and 5 are plan views of the mechanism shown in FIG. 1 in different positions respectively.

Now, when the take-up rotary disc 3B is desired to be rotated at a high speed in the direction of the arrow as in the case of fast forward movement of the magnetic tape T, the fast forward push button SC is pressed, whereupon the operating rod 11C is moved backwardly pushing the front edge of the projection 8C of the swinging member 8. The swinging member 8 is therefore rotated about the pivot 8' counterclockwise against the tension of the spring 17, so that the pulley 9 pivotally mounted on the end 8A of said swinging member is detached from the peripheral surface of the driving wheel 6 as shown in FIG. 3 and the driving wheel 6 is driven from the electric motor in the direction of the arrow shown in said figure. The rotational force of the driving wheel 6 is transmitted to the take-up rotary disc 3A through the belt 7 which is held under considerable tension by the pressing roller 12 pressed thereagainst under the biasing forces of the tension springs 15 and 18 and as a result the take-up rotary disc 3A is forcibly driven in the direction of the arrow at a considerably high speed. Thus, it is possible to take up the magnetic tape T on the take-up reel (not shown), mounted on said rotary disc, from the supply and rewind reel at a considerably high speed, or, in other words, it is possible to achieve fast forward movement of the magnetic tape.

When it is desired to stop the operation of the magnetic tape recorder from this state, the pressure is removed from the fast forward push button, whereupon the current supply to the electric motor is interrupted to stop the same and simultaneously the operating rod 11C is moved forwardly to its original position, removing the pressure from the projection 8C of the swinging member 8. Therefore, the swinging member 8 is allowed to return to its original position shown in FIG. 1 under the tension of the spring 17, and the peripheral surface of the pulley 9 is brought into pressure contact with the peripheral surface of the driving wheel 6 which is rotating at a low speed by virtue of the inertia force of the flywheel 4, with the result that the rewind and supply rotary disc 3A rotates slightly in an opposite direction to the take-up rotary disc 3B. Thus, it is possible to stop the magnetic tape T, which has been running to the right at a high speed, reliably while maintaining it in the slightly tense condition, without imparting an excessively large tension thereto.

Figure 4:
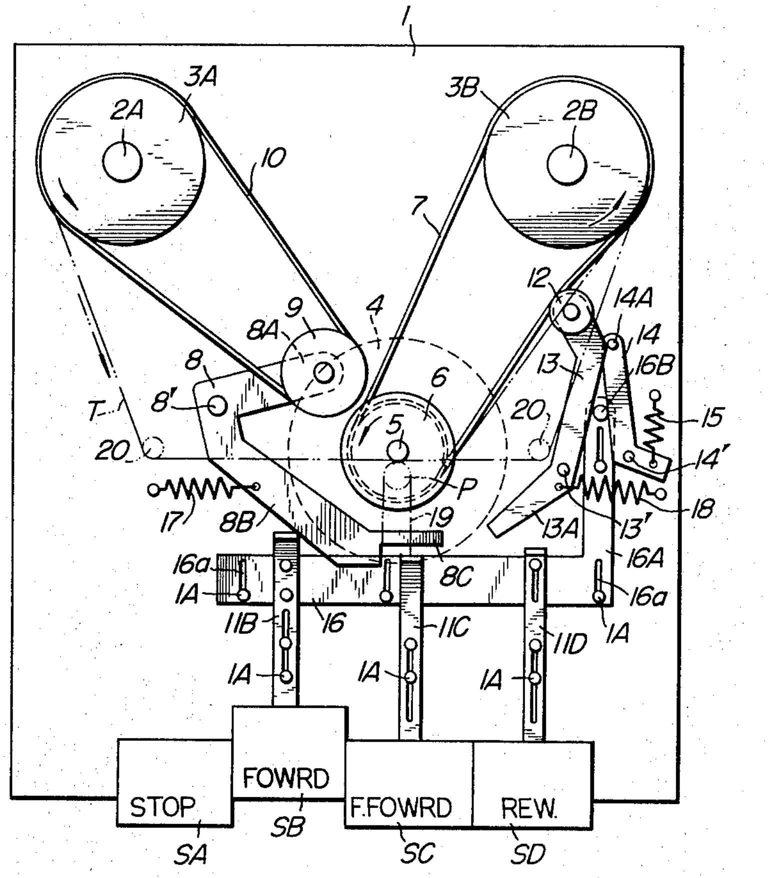

Next, when the magnetic tape T is desired to be driven at the normal speed for recording or reproducing, the normal forward push button SB is pressed and locked in that position as shown in FIG. 4. In this case, a current is supplied to the electric motor, so that the capstan 5 and the driving wheel 6 are driven in the direction of the arrows respectively, and at the same time the slanting edge 8B of the swinging member 8 is pressed by the rear end of the operating rod 11B. Therefore, the swinging member 8 is rotated counterclockwise against the tension of the spring 17 and the pulley 9 on the rear end 8A of said swinging member 8 is disengaged from the peripheral surface of the driving wheel 6 as shown in FIG. 4. Then, by the rearward movement of the sliding member 16, the pinch roller P is brought into pressure contact with the peripheral surface of the capstan 5 through the sliding arm 19 pinching the magnetic tape T between said pinch roller and said capstan rotating in the direction of the arrow, and thereby the magnetic tape is advanced to the right. Simultaneously, the boss 16B at the free end extremity of the arm 16A of sliding member 16 pushes the left side edge of the pressing member 14 causing said pressing member to rotate about the pivotal point 14' clockwise against the tension of the spring 15, so that the upstanding pin 14A on said pressing member is disengaged from the right side edge of the swinging member 13. Therefore, the belt 7 is pressed by the pressing roller 12 on the swinging member 13 lighter than before since said pressing roller is urged against said belt only under the tension of spring 18, and accordingly the tension in the belt is reduced. The take-up rotary disc 3B rotates in the direction of the arrow while slipping on the belt 7 due to the slipperiness of said belt, and the magnetic tape T moving to the right while trailing on the capstan 5 can be taken up reliably without being slackened or without imparting an excessive tension. Thus, the normal forward movement of the magnetic tape is achieved.

To stop the normal forward movement of the magnetic tape, the stop push button SA is pressed to release the normal forward push button SB from its locked state. In this case, the current supply to the electric motor is interrupted to stop said motor and the pinch roller P is disengaged from the capstan 5 as shown in FIG. 1 as a result of the forward movement of the sliding member 16, so that the pressure is removed from the magnetic tape T. At the same time, the boss 16B on the sliding member 16 is disengaged from the left side edge of the pressing member 14, whereby the pin 14A on the pressing member 14 is pressed against the right side edge of the swinging member 13 under the action of the spring 15. The swinging member 13 is now urged to rotate counterclockwise by a force which is the sum of the biasing forces of springs 18 and 15 and thus the belt 7 is strongly pressed by the pressing roller 12 as shown in FIG. 1. Further, in this case, the pressure having been exerted by the operating rod 11B on the arm 8B of swinging member 8 is removed due to the return movement of said operating rod and the swinging member 8 is allowed to return to its original position under the action of the spring 17, so that the pulley 9 on said swinging member is brought into pressure contact with the peripheral surface of the driving wheel 6 as shown in FIG. 1 which driving wheel is rotating slightly by inertia in the direction of the arrow shown in FIG. 4. Thus, it is possible to stop the magnetic tape T in a reliable manner without producing slackness or excessive tension in said tape as in the first mentioned case.

Figure 5:
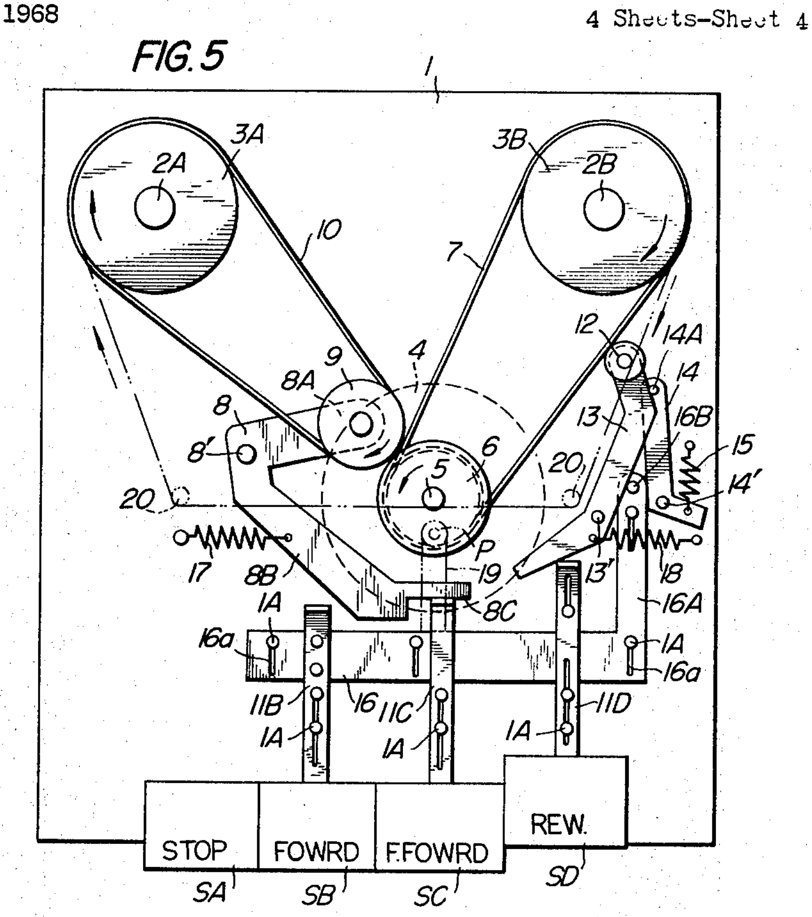

Next, when the magnetic tape T is desired to be rewound on the supply reel on the rotary disc 3A at a considerably high speed, the rewind push button SD is depressed. In this case, the electric motor is set in motion to drive the driving wheel 6 and simultaneously the operating rod 11D is moved backwardly pushing the front slanting edge 13A of the swinging member 13 at its rear end. As a result, the swinging member 13 is rotated clockwise about the pivot point 13' through a considerably large angle against the tension of the spring 18 and thereby the pressing roller 12 at the rear end of said swinging member is detached from the belt 7, so that the slippage between the take-up rotary disc 3B and the belt 7 and between the driving wheel 6 and the belt 7 is increased. Further, since the pulley 9 pivoted to the rear end 8A of the swinging member 8 is in contact with the peripheral surface of the driving wheel 6, which is rotating in the direction of the arrow shown in FIG. 5, with a considerable pressure by virtue of the spring 17, the supply rotary disc 3A is forcibly rotated in the direction of the arrow by the belt 10 at a considerably high speed, rewinding the magnetic tape T on the supply reel on said rotary disc from the take-up reel quickly. Thus, it is possible to achieve rewinding of the magnetic tape.

When the rewind operation is desired to be stopped, the rewind push button SC is set free, whereupon the current supply to the electric motor is interrupted to stop said motor and the operating rod 11D is returned to its original position with its rear end disengaged from the slanting edge 13A of the swinging member 13. Therefore, the swinging member 13 is returned to its original position shown in FIG. 1 under the action of the tension springs 15 and 18, and the pressing roller 12 at the rear end of said swinging member is strongly pressed against the belt 7 increasing the tension in said belt. The rotation of the driving wheel 6, which is rotating in the direction of the arrows at a considerably low rate by inertia, is transmitted to the take-up rotary disc 3B, so that said take-up rotary disc is slightly rotated in sliding engagement with the belt 7 in an opposite direction to the rewind and supply rotary disc 3A. In the manner described, it is possible to stop the magnetic tape T, which has been running to the left at a high speed, reliably in a slightly tensed condition without creating excessive tension therein.

According to the present invention, as described hereinabove, when the magnetic tape T is stopped from the state of normal forward movement (FIG. 4), the state of fast forward (FIG. 3) or the state of fast rewind (FIG. 5), the electric motor is de-energized and the considerably weak rotational force of the driving wheel 6 which is rotating slightly under the inertia force of the flywheel 4 is transmitted to the tape-up rotary disc 3B and the rewind and supply rotary disc 3A through the belts 7 and 10 respectively to rotate said respective rotary discs slightly in directions opposite to each other, whereby it is possible to stop the magnetic tape T reliably without placing it under excessive tension but yet maintaining a slight tension therein. Since, in this way, the transmission elements such as the belts 7, 10 and the pulley 9 can be used simultaneously both as transmission elements and as braking elements, it is possible to eliminate completely the brake shoes, the braking elements for the operating members and the slipping mechanism for winding a tape during normal operation, which have been required in the conventional magnetic tape recorders of this type. Therefore, by employing the present invention, the size and weight of accessory equipment can easily be reduced drastically. The present invention which includes no braking elements as mentioned above, is particularly advantageous in that not only is it simple in structure and easy to operate but also it can be practiced at extremely low cost, and further in that, since the magnetic tape T can be stopped from the state of running at a high speed, in a slightly tense condition as it has been running, without introducing excessive tension therein as described hereinabove, no damage is caused to the magnetic tape and yet the magnetic tape can be stopped exactly with no slackness therein. Thus, the present invention renders the operation of the magnetic tape recorders or similar machines highly convenient and is of great industrial advantage.

Although the present invention has been described and illustrated herein with reference to a specific embodiment thereof wherein the invention is applied to a magnetic tape recorder, it is to be understood that the present invention may also be used as a drive control mechanism for a pair of rotating bodies, such as the take-up rotary disc and rewind and supply rotary disc to drive a carrier such as a film, in other rotating machines such as motion-picture cameras and motion-picture projectors or similar devices where a ribbon-like medium is transferred from one rotating body to the other. It is also to be understood that the belt 10 as used in the embodiment described may be substituted with a transmitting member such as an idler and further the backward movement of the operating rods 11B, 11C and 11D may be effected by other switch means such as a lever-type switch instead of the push button-type switch as shown in the embodiment.

I claim:

1. Means for controlling the drive of a plurality of rotating bodies comprising:

at least first and second rotary discs, a driving wheel, said driving wheel and said rotary discs being mounted on a support member in a mutually spaced relationship, a driving belt made of a material having small coefficients of extension and contraction, said driving belt being placed around said driving wheel and said second rotary disc as to transmit rotational energy from one to the other, means for changing the tension of said driving belt, a pulley laterally movable toward said driving wheel as to be in peripheral contact therewith and away from said driving wheel, a coupling belt drivingly connecting the first rotary disc to said pulley and, operating means for controlling said means for changing the tension of said driving belt and for controlling the position of said pulley with respect to said driving wheel, said operating means including means for pressing said pulley against said driving wheel while maintaining said driving belt in a taut condition, means for pressing said pulley against said driving wheel while operating said tension changing means to place said driving belt in a relatively loose condition, means for moving said pulley away from said driving wheel while operating said tension changing means to place said driving belt in a moderately taut condition and means for moving said pulley away from said driving wheel while maintaining said driving belt in a relatively taut condition.

2. The means defined in claim 1 having in addition a roller member drivingly connected to said driving wheel and pressure means adapted to be moved toward and away from said roller member, said pressure means being operatingly connected to said operating means as to be moved toward said roller member as to exert a pressure on a tape-like element therebetween when said pulley is moved away from said driving wheel and when said driving belt is in said moderately taut condition of tension.

3. The means defined in claim 1 having in addition a plurality of switches, one of said switches being operatively connected to a one of said means included in said operating means.

References Cited

UNITED STATES PATENTS

| | | | |
|---|---|---|---|
| 2,705,262 | 3/1955 | Post et al. | 242—55.12 X |
| 2,778,580 | 3/1957 | Howell et al. | 242—55.12 |
| 2,782,263 | 2/1957 | Hoehn et al. | 42—55.12 X |

LEONARD D. CHRISTIAN, Primary Examnier

U.S. Cl. X.R.

74—199